United States Patent
Qin et al.

(10) Patent No.: US 7,453,894 B1
(45) Date of Patent: Nov. 18, 2008

(54) METHOD AND SYSTEM FOR MODIFYING MESSAGES DURING TRANSMISSION, BASED ON MESSAGE SOURCE AND MESSAGE DESTINATION PROFILES

(75) Inventors: Huiping Qin, Overland Park, KS (US); Tong Zhou, Overland Park, KS (US); Baoquan Zhang, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 625 days.

(21) Appl. No.: 11/109,518

(22) Filed: Apr. 19, 2005

(51) Int. Cl.
*H04L 12/28* (2006.01)
(52) U.S. Cl. .................. 370/401; 370/230; 370/259
(58) Field of Classification Search .............. None
See application file for complete search history.

(56) References Cited

U.S. PATENT DOCUMENTS

| | | | |
|---|---|---|---|
| 5,742,905 A * | 4/1998 | Pepe et al. .............. 455/461 |
| 5,890,120 A | 3/1999 | Haskell et al. | |
| 6,377,925 B1 | 4/2002 | Greene, Jr. et al. | |
| 6,810,259 B1 * | 10/2004 | Zhang .................. 455/456.5 |
| 2004/0263530 A1 | 12/2004 | Sahue et al. ............... 345/619 |
| 2005/0058124 A1 * | 3/2005 | Helferich .................. 370/352 |

FOREIGN PATENT DOCUMENTS

WO  WO 2005/002169 A1  1/2005

OTHER PUBLICATIONS

Ubiquitous Services, Adaptive Services, Thomas Strang, Ludwigs-Maximilians University Munich, http://www.nm.ifi.lmu.de/Vorlesungen/ws0405/ubiserv/05-adaptive-a-22.11.04.pdf, printed from the World Wide Web Feb. 24, 2005.
Van, Jon, *Signs of Progress grow; Software Links Languages of Deaf, Hearing*, http:/pqasb.pqarchiver.com/chicagotribune/doc163546011.html?MAC=6191c9a2b91bf7, pp. 1-3, Chicago Tribune, Sep. 9, 2002, printed from the World Wide Web on Dec 10, 2002.
*Israeli Software Enables Deaf to Use Cell Phones*, http://story.news.yahoo.com/news?tmpl=story2$cid=569&u=/nm/20021126/tc__nm/telecoms__israel?cellcom?dc&printer=1, pp. 1-3, Nov. 26, 2002, printed from World Wide Web on Dec. 10, 2002.
*What is a TTY?*, http:/www.captions.com/tty.html, pp. 1-2, printed from World Wide Web on Oct 28, 2002.
Nakamura, Karen, *About American Sign Language*, http://www.deaflibrary.org/asl.html, pp. 1-8, printed from World Wide Web on Oct. 28, 2002.
*List of Methods*, http://www.zak.co.il/deaf-info/old/methods.htm, pp. 1-3, printed from World Wide Web on Oct. 28, 2002.

(Continued)

*Primary Examiner*—Duc C Ho (57) ABSTRACT

A method and system for using (i) a source profile associated with a source node, and (ii) a destination profile associated with a destination node, in combination to determine at least one modification to make to message content of a message being communicated along a communication path from the source node to the destination node, and then making the at least one modification to the message content to establish a modified message, and then sending the modified message to the destination node via the communication path.

17 Claims, 5 Drawing Sheets

OTHER PUBLICATIONS

*A Basic Dictionary of ASL Terms*, http:www.mastertech-home.com/ASLDict.html, pp. 1-6, printed from World Wide Web on Oct. 28, 2002.

*Fingerspelling Graphics*, http://www.lareau.org/disgraph2.html, pp. 1-3, printed from the World Wide Web on Aug. 23, 2002.

*American Sign Language*, http//www.where.com/scott.net/asl/, p. 1, printed from the World Wide Web on Dec. 20, 2002.

*Yamada Language Center: American Sign Language Fonts*, http://babel.uoregon.edu/yamada/fonts/asl.html, pp. 1-3, printed from the World Wide Web on Aug. 23, 2002.

*Announcing*, http://www.isi-icomm.com/icomm/announcing.php3, pp. 1-2, printed from the World Wide Web on Aug. 30, 2002.

*ICommunicator speech Recognition System*, http://www.hearinglossweb.com/Technology/SpeechRecognition/icommunicator.htm, pp. 1-2, printed from the World Wide Web on Aug. 30, 2002.

*MentisSoftiCommunicator Opens New Doors of Communication for Hearing Impaired*, Business Wire, Mar. 23, 2000, pp. 1-3, http://www.deaftoday.com/mar00/dtnusalno432400.html., printed from the World Wide Web on Aug. 30, 2002.

U.S. Appl. No. 10/327,501, filed Dec. 20, 2003, entitled Client/Server Rendering of Network Transcoded Sign Language Content.

Business Wire—Business/Technology Editors, Natuarl MicroSystems Answers the Call for VocaViva, Tiscali's Pan-European Voice Portal; Tiscali S.p.A. Deploys NMS' Award Winning Voice Portal Platform, Mar. 14, 2001.

Siteowners, Multicity.com Review, downloaded from the World Wide Web at http://www.siteowners.com/review_multicity.shtml on Aug. 5, 2004.

AMAZON.COM, ChatSphere- Machine Translation Software for Chatting and Instant Messaging bidirectional English Arabic [CD], downloaded from the World Wide Web on Aug. 5, 2004.

Luedtke, Joe, Toward Pervasive Computing: in Search of a Unified Communication Model, DM Review Online, Apr. 2003.

TEXTUALLY.ORG, Chinese Translation Service for English Language SMS Messages, downloaded form the World Wide Web at http://www.textually.org/textually/archives/001596.htm on Aug. 2, 2004.

* cited by examiner

|  | 300 | 302 |
|---|---|---|
| 304 Message Form | Visual-Text | Audible |
| 306 Preferred Language | English | Japanese |
| 308 First Preferred Voice Type | Man's voice | Woman's voice |
| 310 Second Preferred Voice Type | Singing Voice | Man's voice |
| 312 Background Music | Country Music | Classical Music |
| 314 Graphic | Yellow | White |
| 316 Font | Helvetica | MS Mincyou |
| 318 Font Size | 10 point | 12 point |
| 320 Font Color | Black | Red |
| Column 1 | Column 2 | Column 3 |

METHOD AND SYSTEM FOR MODIFYING MESSAGES DURING TRANSMISSION, BASED ON MESSAGE SOURCE AND MESSAGE DESTINATION PROFILES

BACKGROUND

1. Field of Invention

The present invention relates to the communication of messages and, more particularly, to the modification of messages during communication of the messages.

2. Description of Related Art

For many people, face-to-face communications are a preferred method for communicating messages to another person or to a group of people. Face-to-face communications may be preferred for various reasons such as (i) knowing that the other person or the group of people understand the messages being conveyed face-to-face, (ii) being able to instantly answer questions the other person or the group of people may have about the messages being conveyed face-to-face, and/or (iii) being able to gage the reaction of the other person or the group of people receiving the messages being conveyed face-to-face.

However, when face-to-face communications are not feasible, people may use other methods to communicate messages to another person or to a group of people. One such method is to communicate messages by sending the messages to the other person or to the group of people via a communication path that comprises a network. As an example, the communication path may comprise a public switched telephone network (PSTN) and/or a wireless phone network that allow a person to send messages to the other person or to the group of people.

Various forms of messages may be sent along a communication path. As an example, one form of messages sent along a communication path is audible messages. Audible messages, such as voice mail messages and MPEG Layer 3 (MP3) messages, may comprise encoded speech, music, and or other sounds. Another form of messages sent along a communication path are visual messages. Visual messages, such as electronic mail (e-mail) messages or Short Message Service (SMS) messages, may comprise visual text messages.

Although a person sending messages may send messages of a first form (e.g., visual messages such as e-mail messages) to intended recipients of the messages, the intended recipient may prefer to receive messages in another form (e.g., audible messages such as voice mail messages). Some service providers perform services for modifying messages so that the messages presented to the intended recipients are in the form preferred by the intended recipients. For example, the service provider Tiscali S.p.A. of Cagilari, Italy, performs a Speechmail service that modifies visual e-mail messages into audible messages. The Speechmail services allow intended recipients to listen to messages that originated as messages having visual message content.

Even though services for modifying messages, such as the Speechmail service, are available for the modifying messages according to preferences of the intended recipients, under some circumstances, it may be preferable to modify messages according to the preferences of both the message sender and the intended recipients. For example, circumstances when it would preferable to modify messages according to the preferences of both the message sender and the intended recipients may occur when the sender of the messages has visual text messages in the English language that the sender desires to send to intended recipients as audible messages, but the intended recipients only speak and understand the Japanese language. In this regard, it would be preferable to modify the sender's messages into audible messages in the Japanese language. However, if the messages are only modified according to the preferences of the sender, then the intended recipients would not be able to understand the messages. Based on these and other circumstances when it would be desirable to modify messages based on preferences of both the sender and the intended recipients, the inventors have discovered a need for an improved system and method for modifying messages.

SUMMARY

The present invention advances over the existing art by providing a mechanism for using (i) a source profile associated with a source node, and (ii) a destination profile associated with a destination node, in combination to determine at least one modification to make to message content of a message being communicated along a communication path from the source node to the destination node, making the at least one modification to the message content to establish a modified message, and then sending the modified message to the destination node via the communication path.

According to an exemplary embodiment of the invention, a network node that sits in a communication path between a source node and a destination node, comprises a communication interface, a processor, and data storage. The communication interface is arranged to (i) receive messages being transmitted along the communication path from the source node to the destination node, and (ii) transmit modified versions of the messages along the communication path for receipt by the destination node. The data storage can store (i) a source profile associated with the source node, (ii) a destination profile associated with the destination node, and (iii) program instructions executable by the processor. The program instructions comprise instructions for (i) using the source profile and the destination profile in combination to determine at least one modification to make to message content of the received messages, and (ii) making the at least one modification to the message content so as to produce the modified version of the messages.

Further, the exemplary embodiment may be carried out as a method that involves (i) receiving a message being communicated along a communication path from a source node associated with a source profile to a destination node associated with a destination profile, the message defining message content, (ii) using the source profile and the destination profile in combination to determine at least one modification to make to the message content, (iii) making the at least one modification to the message content, so as to establish a modified message, and (iv) sending the modified message along the communication path for receipt by the destination node.

These as well as other aspects and advantages will become apparent to those of ordinary skill in the art by reading the following detailed description, with reference where appropriate to the accompanying drawings. Further, it should be understood that the embodiments described in this summary and elsewhere are intended to be examples only and do not necessarily limit the scope of the invention.

BRIEF DESCRIPTION OF DRAWINGS

An exemplary embodiment of the invention is described herein with reference to the drawings, in which.

DETAILED DESCRIPTION

1. Exemplary Architecture

Figure 1:
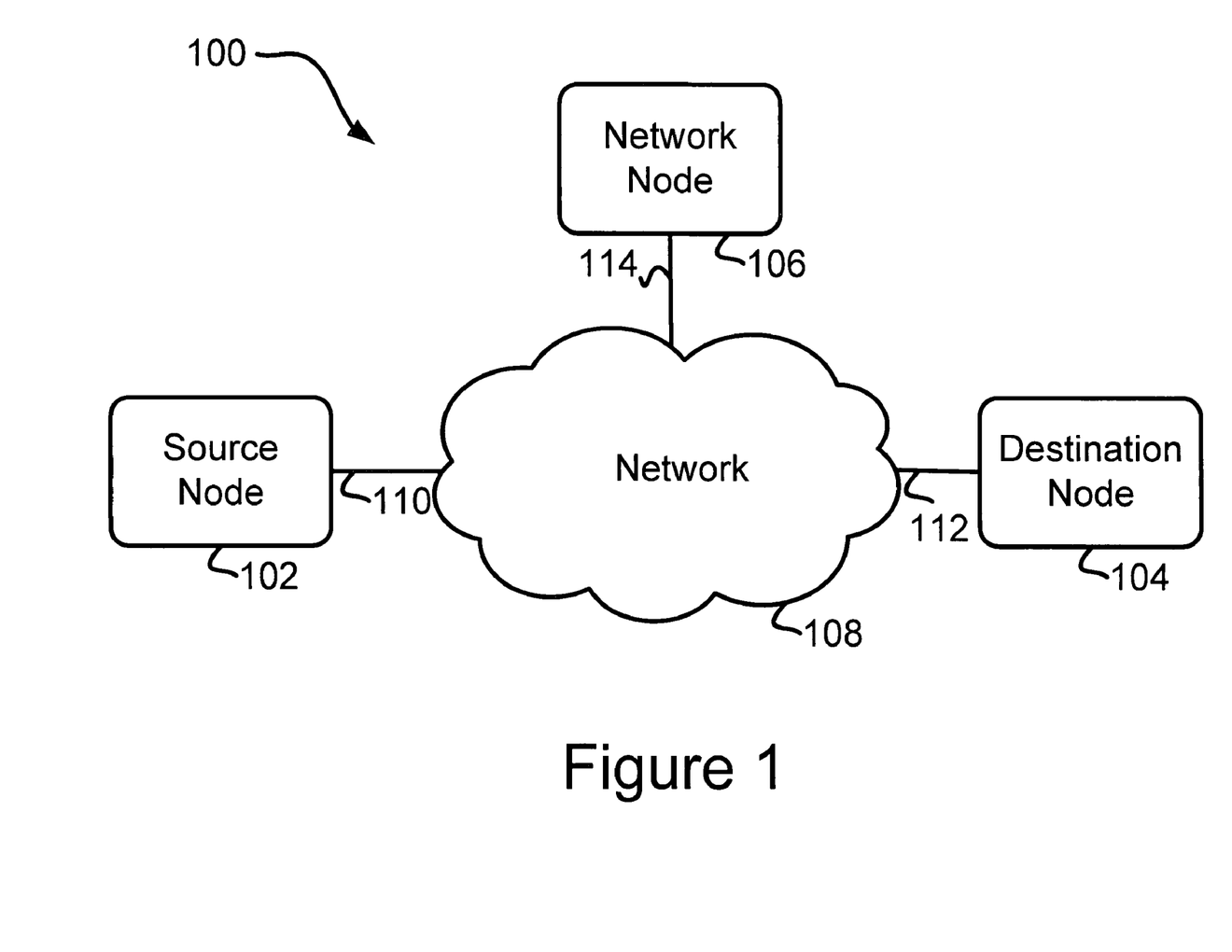
FIG. 1 is a simplified block diagram illustrating a system in which the exemplary embodiment can be implemented.

FIG. 1 is a block diagram of a system 100 for (i) sending messages that define message content, from a source node 102 to a communication path between the source node 102 and a destination node 104, (ii) modifying the message content of the messages at a network node 106, so as to establish modified messages, and (iii) sending the modified messages along the communication path to the destination node 104.

A network 108 comprises the communication path between the source node 102 and the destination node 104. The network 108 comprises (i) a first network channel 110 that couples the source node 102 to the network 108, (ii) a second network channel 112 that couples the destination node 104 to the network 108, and (iii) a third network channel 114 that couples the network node 106 to the network 108. The first network channel 110, the second network channel 112, and the third network channel 114, may each comprise a wireless and/or wired communication channel.

The message content defined by messages sent from source node 102 into the communication path may have a given number of message attributes that characterize the message content and that form a basis for modifying the message content so as to establish a modified version of the message content. Examples of message attributes that form a basis for modifying message content include (i) message content in a visual form, and (ii) message content in an audible form. In this regard, messages having message content in a visual form (e.g., an e-mail message) may be modified so as to comprise message content in an audible form (e.g., an MP3 file converted from the e-mail message). Additional details of message attributes and modifying message content based on message attributes are described below with respect to FIG. 3.

The source node 102, the destination node 104, and the network node 106, are respective devices that perform communications via the network 108. The communications performed via the network 108 may comprise sending messages to the network 108 and/or receiving messages from the network 108. The source node 102, the destination node 104, and the network node 106 may communicate with each other and/or with other devices connected to the network 108 that are not shown for simplicity. The source node 102, the destination node 104, and the network node 106, may also communicate with devices that are not connected to the network 108, but that are connected to the source node 102, the destination node 104, and the network node 106, respectively.

The source node 102 is configured to send messages to the network 108 and to perform other functions described herein. The source node 102 sends messages to the network 108 via an interface to the first network channel 110. The messages sent by the source node 102 comprise a first version of the messages and respectively define a first version of message content for each of the messages.

Various devices may be deployed as the source node 102. For example, devices such as a server or a personal computer may be deployed as the source node 102. Other examples of devices that could be deployed as the source node 102 include wireless phones, landline phones, Voice over Internet Protocol (VoIP) devices, or personal digital assistants (PDAs). Additional examples of devices that may be deployed as the source node 102 are also possible.

The network node 106 is configured to (i) receive messages sent from the source node 102, (ii) send messages to the destination node 104, and (iii) perform other functions described herein. The network node 106 may send messages to the source node 102 and receive messages from the destination node 104, via the network 108. The network node 106 receives messages from the network 108 and sends messages to the network 108 via an interface to the third communication channel 114.

Various devices or combination of devices may be deployed as the network node 106. For example, a device such as a network server could be deployed as the network node 106. In this regard, the network server may comprise a workstation or personal computer that executes program logic for performing network server functions. As another example, a network server and a remote data storage device in combination could be deployed as the network node 106. Other examples of devices or combinations of devices that may be deployed as the network node 106 are also possible.

The destination node 104 is configured to receive messages from the network node 106 and to perform other functions described herein. Some of these other functions performed by the destination node 104 may include storing the received messages in data storage, and/or presenting the messages or the message content to a user of the destination node 104. The messages received by the destination node 104 comprise second versions of the messages (i.e., modified versions of the first messages).

Various devices may be deployed as the destination node 104. For example, devices such as a server or personal computer may be deployed as the destination node 104. Other examples of devices that could be deployed as the destination node 104 include wireless phones, landline phones, VoIP devices, PDAs, or wireless paging devices. Additional examples of devices that may be deployed as the destination node 104 are also possible.

The network 108 may comprise a single network segment. A network segment is an uninterrupted length of network communication channel. A network segment may comprise any public or private wireless and/or wireline communication channel. The source node 102, the destination node 104, and the network node 106 could each be connected to the single network segment.

Alternatively, the network 108 may comprise two or more network segments that are connected in combination to form a network larger than any of the two or more network segments individually. The two or more network segments may comprise any combination of public or private wireless and/or wireline communication channels.

Various means are available for connecting two or more network segments in combination. A popular means for connecting two or more network segments are switches. Various forms of switches may be used to connect two or more network segments. For example, the switches may take the form of routers that (i) connect a plurality of network segments such as a first network segment and a second network segment, and (ii) direct messages from the first network segment to the second network segment.

As another example, a switch for connecting two or more network segments may take the form of a Local Exchange Carrier (LEC) Central Office (CO). The CO is a switch that connects a plurality of network segments in the form of wireline phone lines of a public switched telephone network (PSTN). The wireline phone lines may include (i) local loop phone lines that are routed between a CO and customer premises such as houses or factories, and (ii) trunk lines that are routed between the CO and remote COs. The PSTN provides for performing circuit-switched message communications via the network 108. Other examples of switches and other examples of means for connecting two or more network segments are also possible.

As noted above, the network 108 may include wireless communication channels. These wireless communication channels may be part of a radio access network (RAN) that forms at least a portion of the network 108. A RAN may include a base transceiver station (BTS), a radio frequency (RF) air interface operating between a wireless device (e.g., the source node 102, the destination node 104, or the network node 106) and the BTS, and a base station controller (BSC). The BTS radiates RF signals away from the BTS to form a cell. The radiated RF signals are arranged according to an air interface protocol, such as the CDMA air interface protocol or some other air interface protocol.

The BSC performs many functions. For example, the BSC (i) manages the use of the BTS, (ii) controls handoff of a wireless device from one BTS to another BTS as the wireless device moves from one cell to another cell, and (iii) provides connection interface to a mobile switching center (MSC).

The BSC may provide connection interface to a packet-switched network gateway. The packet-switched network gateway may convert data in a first form that is compatible with transmitting on a first network segment (e.g., a RAN) to data in a second form that is compatible with transmitting on a second network segment (e.g., a packet-switched network segment). An example of a packet-switched network gateway is a packet data serving node (PDSN).

The MSC performs switching functions to set up and tear down calls via a PSTN. As an example, the MSC can set up and tear down phone calls placed by wireless devices to remote phones coupled to the PSTN. The phone calls set up by the MSC may be set up to establish a part of the communication path for communicating messages between the source node 102 and the destination node 104.

The wireless communication channels of the network 108 carry out the communication of messages according to a wireless air interface protocol. Various wireless air interface protocols are available for performing wireless communications of messages. For example, the wireless air interface protocols may include protocols commonly used in a cellular RAN such as an Advance Mobile Phone Service (AMPS) protocol, the CDMA protocol, a Universal Mobile Telecommunications Service (UMTS) protocol, or a Generic Packet Radio Services (GPRS) protocol. As another example, the wireless air interface protocols may be carried out according to a standard for Wireless Local Area Networks, such as an IEEE 802.11 standard, or a standard for Wireless Metropolitan Area Networks, such as an IEEE 802.16 standard, or the Bluetooth® specification. Other examples of wireless air interface protocols are also possible.

Further, as noted above, some of the network segments of the network 108 may comprise wireline communication channels. Wireline communication channels carry out the communication of messages according to a wireline communication protocol. Various wireline communication protocols are available for communicating messages via wireline communication channels. For example, the wireline communication protocols may include a protocol carried out according to (i) a standard for the Ethernet, such as an IEEE 802.3 standard, (ii) a standard for token bus networks, such as an IEEE 802.4 standard, or (iii) a standard for token ring networks, such as an IEEE 802.5 standard. Other examples of wireline communication protocols are also possible.

Figure 2:
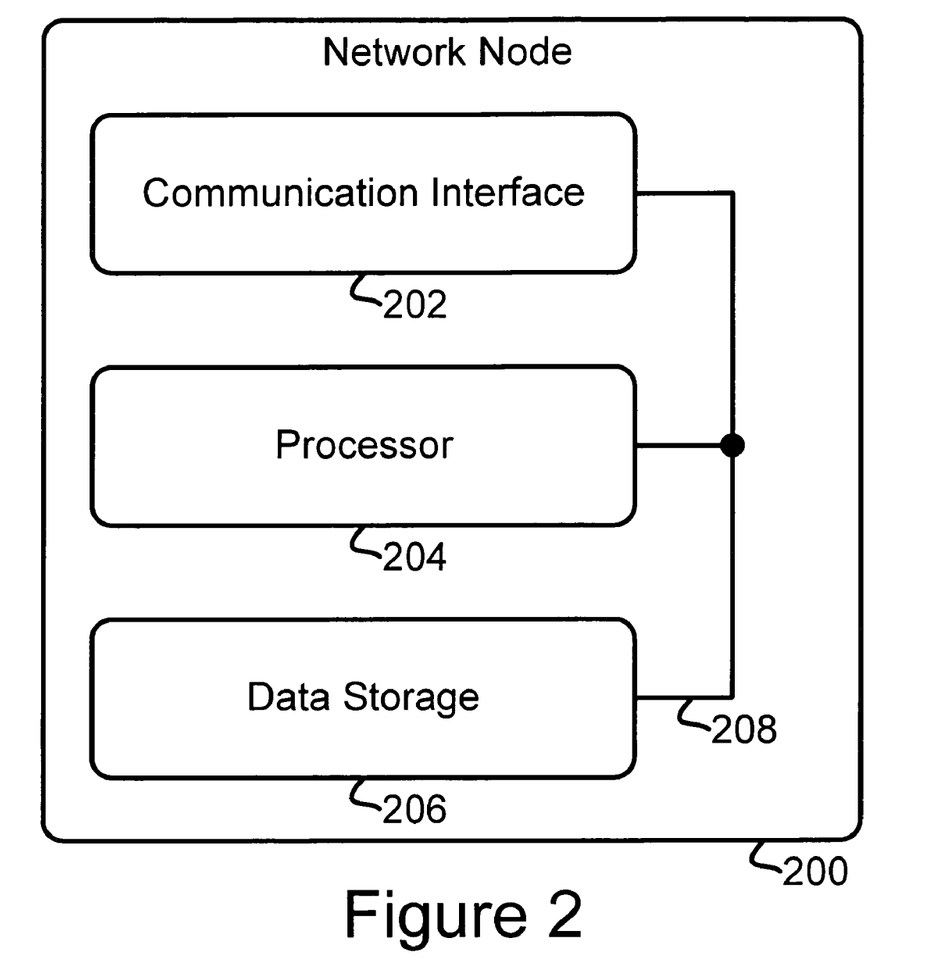
FIG. 2 is a simplified block diagram illustrating a network node in which the exemplary embodiment can be implemented.

Next, FIG. 2 depicts a block diagram of a network node 200 according to the exemplary embodiment. The network node 106 shown in FIG. 1 may take the form of the network node 200. The network node 200 comprises a communication interface 202, a processor 204, and data storage 206, all linked together via a system bus, network, or other connection mechanism 208.

The communication interface 202 provides means for sending various types of data to one or more networks and/or for receiving various types of data from one or more networks. As an example, the communication interface 202 can receive data in the form of messages from the network 108, as well as send data in the form of message to the network 108. As another example, the communication interface 202 may receive data in the form of source profiles and/or destination profiles. Other examples of data the communication interface 202 can send to or receive from the one or more networks are also possible.

The communication interface 202 may include a chipset and antenna for performing wireless communications over wireless communication channels. An exemplary chipset that facilitates communication according to the CDMA protocol is the MSM6000™ chipset manufactured by Qualcomm Incorporated of San Diego, Calif. An exemplary chipset that facilitates communication according to the Bluetooth specification is the BCM2004 chipset manufactured by the Broadcom Corporation of Irvine, Calif. Other examples of chipsets for performing wireless communications over wireless communication channels are also possible.

Alternatively, or in combination, the communication interface 202 may include a chipset for performing wireline communications over wireline communication channels. The chipset for performing wireline communications may be mounted on a network interface card (NIC). An exemplary NIC with a chipset for performing wireline communications according to the IEEE 802.3 protocol (and other protocols) is the SP2610R Gigabit Ethernet Adapter NIC manufactured by the Spectrum Technologies Corporation of Taipei Hsien, Taiwan, Republic of China. Other examples of NICs with a chipset for performing wireline communications are also possible.

The processor 204 may comprise one or more processors (e.g., a general purpose processor and/or a digital signal processor). The processor 204 provides means for executing program logic that allows the processor 204 to work in cooperation with the communication interface 202 and/or the data storage 206 so as to carry out functions described herein.

For example, the processor 204 may execute program logic arranged to determine at least one modification to make to message content defined by a message transmitted from the source node 102, received by the communication interface 202, and destined for the destination node 104. The processor 204 uses the source profile associated with the source node 102 and the destination profile associated with the destination node 104 in order to make the determination. Examples of using the source profile and the destination profile to determine at least one modification to make to message content are discussed below with respect to FIG. 3.

As another example, the processor 204 may execute program logic arranged to perform text-to-speech (TTS) conversion of message content in a visual form (e.g., encoded text) to message content in an audible form (e.g., encoded speech). An example of program logic to perform TTS conversion is "Nuance Vocalizer™ 4.0" TTS software, which is available from Nuance Communications, Inc. of Menlo Park, Calif. Other examples of program logic to perform TTS conversion are also possible.

As yet another example, the processor 204 may execute program logic arranged to perform voice-to-text (VTT) conversion of message content in an audible form (such as encoded speech in the form of an MP3 file) into message content in a visual form. An example of program logic to perform VTT conversion is "Better Wave to Text, Version 5.0" software, which is available from Research Lab, Inc. of Rockville, Md., 20853. Other examples of program logic to perform VTT conversion are also possible.

As still yet another example, the processor 204 may execute program logic to translate message content from a first language to a second language. The processor 204 may execute program logic to modify message content in the English language content to message content in the Japanese language.

And as still yet another example, the processor 204 may execute program logic to modify message content in an audible language to message content in the form of visual sign language for the hearing impaired. Details of such program logic may be found in co-pending U.S. patent application Ser. No. 10/327,501, filed Dec. 20, 2003, and entitled "Client/Server Rendering of Network Transcoded Sign Language Content," the entirety of which is incorporated by reference.

The processor 204 can execute program logic for creating modified messages that include modified message content. The processor 204 can also execute program logic for readdressing the modified messages for use in routing the modified messages to the destination node 104 and/or to an intermediate node (e.g., a router) that sits in the communication path between the network node 200 and the destination node 104. The processor 204 can work cooperatively with the communication interface 202 to transmit the modified messages to the network 108 for transmission in turn of the modified messages to the destination node 104.

The data storage 206 provides means for storing various types of data. For example, the data storage 206 may store data in the form of program logic that is executable by the processor 204, such as the program logic described herein. As another example, the data storage 206 may store data in the form of profiles. Each profile stored in the data storage 206 may be associated with a respective source node or a respective destination node. As yet another example, the data storage 206 may store message content and/or modified message content. Other examples of the data the data storage 206 may store are also possible.

In order to store data, the data storage 206 may comprise a computer readable medium, such as a magnetic disc, an optical disc, organic memory, and/or any other volatile or non-volatile mass storage system readable by the processor 204. Alternatively, the data storage 206 may comprise a combination of two or more segments of computer readable media. For example, data storage 206 may comprises a first segment of data storage located in the processor 204 and a second segment of data storage remote from the processor 204. Other examples of data storage segments are also possible.

The source profiles stored in the data storage 206 are associated with respective source nodes and the destination profiles stored in the data storage 206 are associated with respective destination nodes. Each profile (source profile or destination profile) may have a respective number of profile attributes. Ideally, each profile would have the same number of profile attributes. However, profiles could be arranged such that they do not all have the same number of profile attributes.

Figure 3:
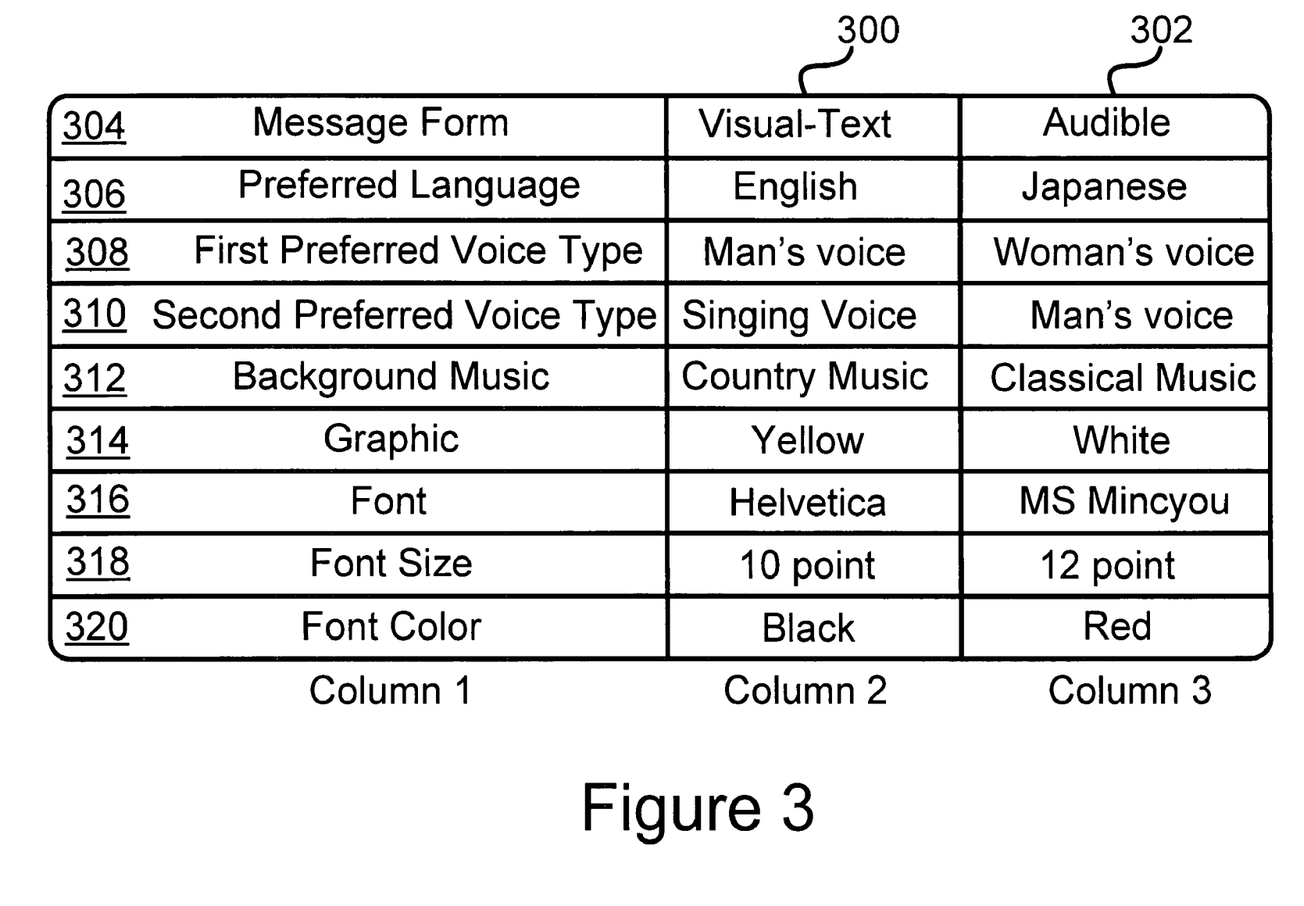
FIG. 3 is a diagram illustrating content of user profiles stored in data storage.

FIG. 3 depicts an example of a first profile 300 (shown in Column 2) and a second profile 302 (shown in Column 3). The first profile 300 and the second profile 302 may be stored in the data storage 206 shown in FIG. 2. The first profile 300 may be characterized as a source profile associated with the source node 102 when the source node 102 is the source of a message being communicated along the communication path from the source node 102 to the destination node 104. Alternatively, the first profile 300 may be characterized as a destination profile associated with the source node 102 when the source node 102 is a destination for a message being communicated to the source node 102 from another source node.

The second profile 302 may be characterized as a destination profile associated with the destination node 104 for a message being communicated along the communication path from the source node 102 to the destination node 104. Alternatively, the second profile 302 may be characterized as a source profile associated with the destination node 104 when the destination node 104 is the source of a message being communicated to another destination node.

The first profile 300 and the second profile 302 each depict nine (9) profile attributes. Alternatively, the first profile 300 and/or the second profile 302 may include a number of profile attributes greater than or less than nine (9) profile attributes. The profile attributes each define a characteristic of message content. Profile attributes from both the first profile 300 and the second profile 302 may form the basis for determining at least one modification to make to message content of a message being communicated along the communication path.

Column 1 of FIG. 3 depicts a list of profile attribute descriptors for each of the nine (9) profile attributes of the first profile 300 and of the second profile 302. By way of example, the list of profile attribute descriptors may include profile attribute descriptors such as (i) message form, (ii) preferred language, (iii) first preferred voice type, (iv) second preferred voice type, (v) background music, (vi) graphic, (vii) font, (viii) font size, and (ix) font color. Alternatively, the list of profile attribute descriptors could define another set of profile attribute descriptors that include none, some, or all of the profile attribute descriptors shown in Column 1 and/or one or more other profile attribute descriptors. Storage of the list of profile attribute descriptors in data storage is optional.

The profile attributes of the first profile 300 and of the second profile 302 could be arranged in various ways for storage in data storage. For example, the profile attributes could be arranged and stored, as defined by a data dictionary or by a respective data dictionary for each profile attribute. A data dictionary is a table that defines characteristics of data such as data name and length of data. Examples of data dictionaries for the profile attributes of the first profile 300 and of the second profile 302 are shown below. Other examples of arranging profile attributes of the first profile 300 and of the second profile 302 for storage in data storage are also possible.

A first profile attribute descriptor 304 is "Message Form." Various forms of messages that indicate a basis for modifying message content are available for use as a "Message Form" attribute of the first profile 300 and of the second profile 302. An example of a data dictionary that uses two data bits to define forms of messages that a user may select as a "Message Form" profile attribute is shown in Table 1.

TABLE 1

| Data | Message Form |
| --- | --- |
| 00 | Visual - Text |
| 01 | Visual - Sign Language |
| 10 | Audible |
| 11 | Reserved |

By way of example, as shown in FIG. 3, the "Message Form" profile attribute of the first profile 300 is "Visual-Text" (stored in data storage as "00") and the "Message Form" profile attribute of the second profile 302 is "Audible" (stored in data storage as "10"). As another example, the "Message Form" profile attribute of the first profile 300 and the "Message Form" profile attribute of the second profile 302 may be the same "Message Form" profile attribute, such as "Visual-Sign Language" (stored in data storage as "01"). Profile attributes defined as "Reserved" allow for adding other profile attributes to a data dictionary, such as when a new profile attribute becomes available for characterizing message content.

A second profile attribute descriptor 306 is "Preferred Language." Various languages that indicate a basis for modifying message content are available for use as a "Preferred Language" attribute of the first profile 300 and of the second profile 302. An example of a data dictionary that uses three data bits to define languages that a user may select as a "Preferred Language" profile attribute is shown in Table 2.

TABLE 2

| Data | Preferred Language |
| --- | --- |
| 000 | English |
| 001 | Japanese |
| 010 | German |
| 011 | French |
| 100 | Spanish |
| 101 | Chinese (1st Dialect) |
| 110 | Chinese (2nd Dialect) |
| 111 | Korean |

By way of example, as shown in FIG. 3, the "Preferred Language" profile attribute of the first profile 300 is "English" (stored in data storage as "000") and the "Preferred Language" profile attribute of the second profile 302 is "Japanese" (stored in data storage as "001").

A third profile attribute descriptor 308 is "First Preferred Voice Type." Various voice types that indicate a basis for modifying message content are available for selecting as a "First Preferred Voice Type" attribute of the first profile 300 and of the second profile 302. An example of a data dictionary that uses three data bits to define voice types that a user may select as a "First Preferred Voice Type" profile attribute is shown in Table 3.

TABLE 3

| Data | Preferred Voice Type |
| --- | --- |
| 000 | Man's Voice |
| 001 | Woman's Voice |
| 010 | Boy's Voice |
| 011 | Girl's Voice |
| 100 | Singing Voice |
| 101 | Reserved |
| 110 | Reserved |
| 111 | Reserved |

The preferred voice type of "Man's Voice" indicates that message content should be modified as encoded speech such that presentation of the encoded speech sounds as if a man is speaking the message content. Similarly, preferred voice types of "Woman's Voice," "Boy's Voice," and "Girl's Voice" indicate that message content should be modified as encoded speech such that presentation of the encoded speech sounds as if a woman, boy, or girl, respectively is speaking the message content. Other examples of a data dictionary that defines voice types for the "First Preferred Voice Type" are also possible.

The preferred voice type of "Singing Voice" indicates that message content should be modified as encoded speech such that presentation of the encoded speech sounds as if the message content is being sung.

By way of example, as shown in FIG. 3, the "First Preferred Voice Type" profile attribute of the first profile 300 is "Man's Voice" (stored in data storage as "000") and the "First Preferred Voice Type" profile attribute of the second profile 302 is "Woman's Voice" (stored in data storage as "001").

A fourth profile attribute descriptor 310 is "Second Preferred Voice Type." Various voice types that indicate a basis for modifying message content are available for use as a "Second Preferred Voice Type" attribute of the first profile 300 and of the second profile 302. The data dictionary shown in Table 3 may be used to define the data for the "Second Preferred Voice Type" attributes. Alternatively, a second data dictionary (not shown) that defines voice types could be used to define the data for the "Second Preferred Voice Type" attributes.

As shown in FIG. 3, the "Second Preferred Voice Type" profile attribute of the first profile 300 is "Singing Voice" (stored in data storage as "100"). The "Second Preferred Voice Type" profile attribute could be used in combination with the "First Preferred Voice Type" profile attribute to indicate, at least in part, how message content should be modified. For example, if a determination to modify message content is based on (i) the "Message Form" profile attribute of the second profile 302, (ii) the "First Preferred Voice Type" of the first profile 300, and (iii) the "Second Preferred Voice Type" of the first profile 300, then the modification to message content could comprise modifying message content such that the message content comprises encoded speech to sound like a man singing the message content.

By way of another example, as shown in FIG. 3, the "Second Preferred Voice Type" profile attribute of the second profile 302 is "Man's Voice." In this regard, under a given set of circumstances, the "Second Preferred Voice Type" could indicate the basis for modifying message content instead of the "First Preferred Voice Type." An example of the given set of circumstances is when the network node 106 does not have the capability to modify the message content according to the "First Preferred Voice Type." Other examples of the given set of circumstances when the "Second Preferred Voice Type" profile attribute would be used instead of the "First Preferred Voice Type" profile attribute are also possible.

A fifth profile attribute descriptor 312 is "Background Music." Various music passages and/or music types that indicate a basis for modifying message content are available for use as a "Background Music" attribute of the first profile 300 and of the second profile 302. A "Background Music" attribute could be stored as a string of data that represents the name of a music passage and/or a music genre. For example, a "Background Music" attribute could be stored as a string of data to represent a passage of music from Ludwig van Beethoven's $5^{th}$ Symphony as performed by a given orchestra.

An example of a data dictionary that uses two data bits to define music genres that a user may select as a "Background Music" profile attribute is shown in Table 4.

TABLE 4

| Data | Background Music (Music Genre) |
|------|-------------------------------|
| 00   | Country Music                 |
| 01   | Classical Music               |
| 10   | Jazz Music                    |
| 11   | Polka Music                   |

By way of example, the profile attribute of "Background Music" of the first profile 300 is "Country Music" and the profile attribute of "Background Music" of the second profile 302 is "Classical Music."

A sixth profile attribute descriptor 314 is "Graphic." A graphic forms at least a part of message content that is presented visually. For example, a graphic may comprise an image file that is displayed with other message content (e.g., a text message) in a visual form. The image file may be stored in any of a variety of file formats such as the Bitmap (".bmp") format or the Joint Photographic Experts Group (".jpg") format. A graphic may be used over an entire display area or a portion of a display area of a display used to visually present message content.

As another example, a graphic may comprise a display color upon which text of another color of a text message is displayed. Various graphic display colors that indicate a basis for modifying message content are available for use as a "Graphic" attribute of the first profile 300 and of the second profile 302. An example of a data dictionary that uses two data bits to define available graphic display colors that a user may select as a "Graphic" profile attribute is shown in Table 5.

TABLE 5

| Data | Graphic |
|------|---------|
| 00   | Black   |
| 01   | White   |
| 10   | Yellow  |
| 11   | Red     |

By way of example, as shown in FIG. 3, the "Graphic" profile attribute of the first profile 300 is "Yellow" (stored in data storage as "10") and the "Graphic" profile attribute of the second profile 302 is "White" (stored in data storage as "01").

A seventh profile attribute descriptor 316 is "Font." Various fonts that indicate a basis for modifying message content are available for use as a "Font" profile attribute of the first profile 300 and of the second profile 302. An example of a data dictionary that uses three data bits to define fonts that a user may select as a "Font" profile attribute is shown in Table 6.

TABLE 6

| Data | Font            |
|------|-----------------|
| 000  | Arial           |
| 001  | Courier         |
| 010  | Georgia         |
| 011  | Helvetica       |
| 100  | MS Mincyou      |
| 101  | New Gothic      |
| 110  | Times New Roman |
| 111  | Verdana         |

By way of example, as shown in FIG. 3, the "Font" profile attribute of the first profile 300 is "Helvetica" (stored in data storage as "011") and the "Font" profile attribute of the second profile 302 is "MS Mincyou" (stored in data storage as "100"). Accordingly, if a determination is made to modify message content according to the "Font" profile attribute of the first profile 300, then the modified message content comprises text arranged using the Helvetica font.

An eighth profile attribute descriptor 318 is "Font Size." Various font sizes that indicate a basis for modifying message content are available for use as a "Font Size" profile attribute of the first profile 300 and of the second profile 302. An example of a data dictionary that uses two data bits to define font sizes that a user may select as a "Font Size" profile attribute is shown in Table 7.

TABLE 7

| Data | Font Size     |
|------|---------------|
| 00   | 6 Point Font  |
| 01   | 8 Point Font  |
| 10   | 10 Point Font |
| 11   | 12 Point Font |

By way of example, as shown in FIG. 3, the "Font Size" profile attribute of the first profile 300 is "10 Point" (stored in data storage as "10") and the "Font Size" profile attribute of the second profile 302 is "12 Point" (stored in data storage as "11"). Accordingly, if message content is modified according to the "Font Size" profile attribute of the first profile 300, the modified message content comprises text arranged using a 10 point font size.

A ninth profile attribute descriptor 320 is "Font Color." Various font colors that indicate a basis for modifying message content are available for use as a "Font Color" attribute of the first profile 300 and of the second profile 302. An example of a data dictionary that uses two data bits to define font colors that a user may select as a "Font Color" profile attribute is shown in Table 8.

TABLE 8

| Data | Font Color |
|------|------------|
| 00   | Black      |
| 01   | Yellow     |
| 10   | Blue       |
| 11   | Red        |

By way of example, as shown in FIG. 3, the "Font Color" profile attribute of the first profile 300 is "Black" (stored in data storage as "00") and the "Font Color" profile attribute of the second profile 302 is "Red" (stored in data storage as "11"). Accordingly, if message content is modified according to the "Font Color" profile attribute of the first profile 300, the modified message content comprises text arranged using a black font.

In making the determination to make at least one modification to message content, program logic may be arranged to determine if the message content is already in a form according to a source profile (e.g., the first profile 300) and a destination profile (e.g., the second profile 302). If the message content is not in a form according to the source profile and the destination profile, then program logic may be executed that determines how to modify the message content based on at least one profile attribute of the source profile and one profile attribute of the destination profile.

Hierarchies of profile attributes may be defined to establish a level of precedence to use in selecting which profile attributes of the source profile and the destination profile will form the basis for modifying message content. Use of hierarchies of profile attributes is one method that can be used in determining at least one modification to make to message content when profile attributes of the source profile and the destination profile are not the identical (i.e., a conflict exists).

2. Exemplary Operation

Figure 4:
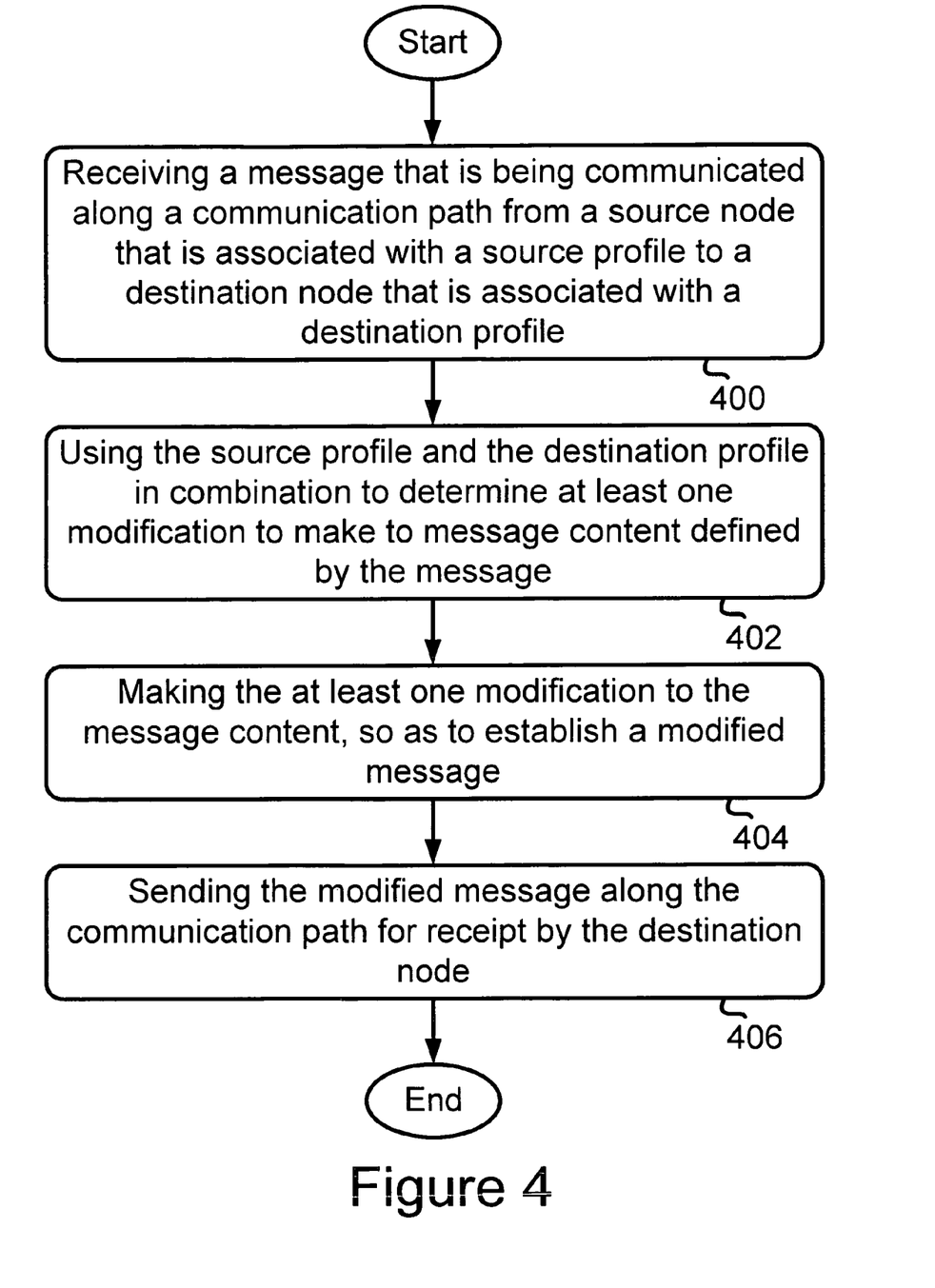
FIG. 4 is a flow chart depicting functions that can be carried out in accordance with the exemplary embodiment.

FIG. 4 is a flow chart provided to illustrate some of the functions that may be carried out with the exemplary embodiment. As shown in FIG. 4, block 400 involves receiving a message that is being communicated along a communication path from a source node associated with a source profile to a destination node associated with a destination profile.

Receiving the message may occur in various ways. For example, receiving the message may be carried out by a communication interface, such as the communication interface 202 shown in FIG. 2. In this regard, the message may be communicated to the communication interface 202 via a wired network channel or a wireless network channel such that the communication interface 202 receives the message via a wired network interface or a wireless network interface of the communication interface 202, respectively.

As another example, receiving the message could be carried out by the message being received at data storage, such as the data storage 206 shown in FIG. 2. In this regard, the communication interface 202 may receive the message and then send the message along the system bus 208 to the data storage 206. After receiving the message, the data storage 206 may store the message and/or the message content of the message, for subsequent processing of the message content. The subsequent processing of the message content may include modifying the message content. Other examples of methods for receiving the message are also possible.

The received message may comprise address indicia that facilitates the message being communicated along the communication path to the destination node. The address indicia may indicate that the message should be routed to a network node prior to being routed to the destination node. Various devices (e.g., routers) that are a part of the communication path may facilitate the message being communicated along the communication path to the network node 106 and from the network node 106 to the destination node 104.

Address indicia may be used by the network node 106 to identify the source node 102 and the destination node 104. Further, address indicia may be used by the network node 106 to identify respective profiles that are associated with the source node 102 and the destination node 104. The address indicia may comprise Internet Protocol (IP) addresses for the source node 102 and the destination node 104.

Next, block 402 involves using the source profile and the destination profile in combination to determine at least one modification to make to message content defined by the message. Using the source profile and the destination profile in combination to determine the at least one modification may be carried out by the processor 204. The processor 204 may execute program logic to determine the at least one modification to be made to message content.

The program logic executable by the processor 204 to determine the at least one modification may be arranged such that the attributes of both the source profile and the destination profile have a corresponding level of priority for use in determining the at least one modification to make to message content. These levels of priority may be defined in a hierarchy of profile attributes.

As an example, the "Message Form" profile attribute of the first profile 300 may have the highest level of priority, and the "Graphic", "Font", "Font Size" and "Font Color" profile attributes of the second profile 302 may each have the next highest level of priority when the "Message Form" profile attribute of the first profile 300 is "Visual Text." In this regard, if the message content received by the network node 200 comprises encoded speech (i.e., audible message content), then execution of the program logic by the processor 204 results in the processor 204 making a determination that the at least one modification comprises (i) modifying the message content from encoded speech to message content in the form of visual text, and (ii) modifying the message content such that the message content comprises a white graphic (background color) and that any text of the message is in 12 point MS Mincyou font in the color red.

As another example, the program logic executable by the processor 204 may be arranged to determine (i) a first modification to make to message content so as to establish interim message content, and (ii) a second modification to make to the interim message content so as to establish modified message content that is sent to the destination node. The first modification could be based on the source profile and the second modification could be based on the destination profile. Alternatively, the first modification could be based on the destination profile and the second modification could be based on the source profile. Other examples of using the source profile and the destination profile in combination to determine at least one modification to make to message content are also possible.

Next, block 404 involves making the at least one modification to the message content, so as to establish a modified message. Making the at least one modification to the message content may be carried out by the processor 204 executing program logic arranged to make the at least one modification. The program logic arranged to make the at least one modification may be arranged in various configurations.

In one respect, the program logic arranged to make the at least one modification may be configured to modify message content by establishing an interim message content and to then modify the interim message content so as to establish the modified message content. Making the modification to establish the interim message content may be based on the source profile, and making the modification to establish the modified message content may be based on the destination profile. Alternatively, making the modification to establish the interim message content may be based on the destination profile, and making the modification to establish the modified message content may be based on the source profile. Other methods of using the source profile and the destination profile in combination to establish the interim message content and/or the modified message content are also possible.

As an example, message content in the form of written text in a first language (e.g., English) may be translated to message content comprising written text in a second language (e.g., Japanese) so as to establish the interim message content, and then the interim message content can be modified from written text in the second language to encoded speech in the second language so as to establish the modified message content. In this regard, upon receiving the modified message content, the destination node can present the modified message content as an audible message in the Japanese language to a user of the destination node.

As another example, message content in the form of written text (or encoded speech) in a first language (e.g., English) may be translated to written message content in a second language (e.g., Japanese) so as to establish interim message content, and then the interim message content can then be modified from written message content in the second language to an encoded audio file (e.g., an MP3 file) that includes (i) encoded speech in the second language, and (ii) particular background music. A user listening to this audio file would be able to hear a message spoken in Japanese and the particular background music.

In another respect, the program logic arranged to make the at least one modification may be configured to modify message content directly to modified message content without converting the message content to interim message content. For example, message content in the form of encoded speech (e.g., a voice mail message spoken by a man) in a first language (e.g., English) may be modified directly to modified message content in the form of encoded speech in a second language and with one or more voice characteristics. In this regard, for example, the second language may be Japanese, and the one or more voice characteristics may comprise a woman's voice and a singing voice, such that the modified message content comprises encoded speech in the Japanese language that when presented to a user sounds as if a woman is singing the message in Japanese.

Next, block 406 involves sending the modified message along the communication path for reception of the modified message by the destination node. The modified message may comprise the modified message content and an address that identifies the destination node. This address may comprise a phone number, an IP address, or some other type of address that identifies the location of the destination node.

Sending the modified message along the communication path may be carried out by the communication interface 202. In this regard, sending the modified message to the communication path may comprise the communication interface 202 sending the modified message via a wired network channel or a wireless network channel, for transmission in turn of the modified message along the communication path to the destination node. Devices (e.g., routers) that are part of the communication path may use the address that identifies the destination node to route the modified message to the destination node.

Figure 5:
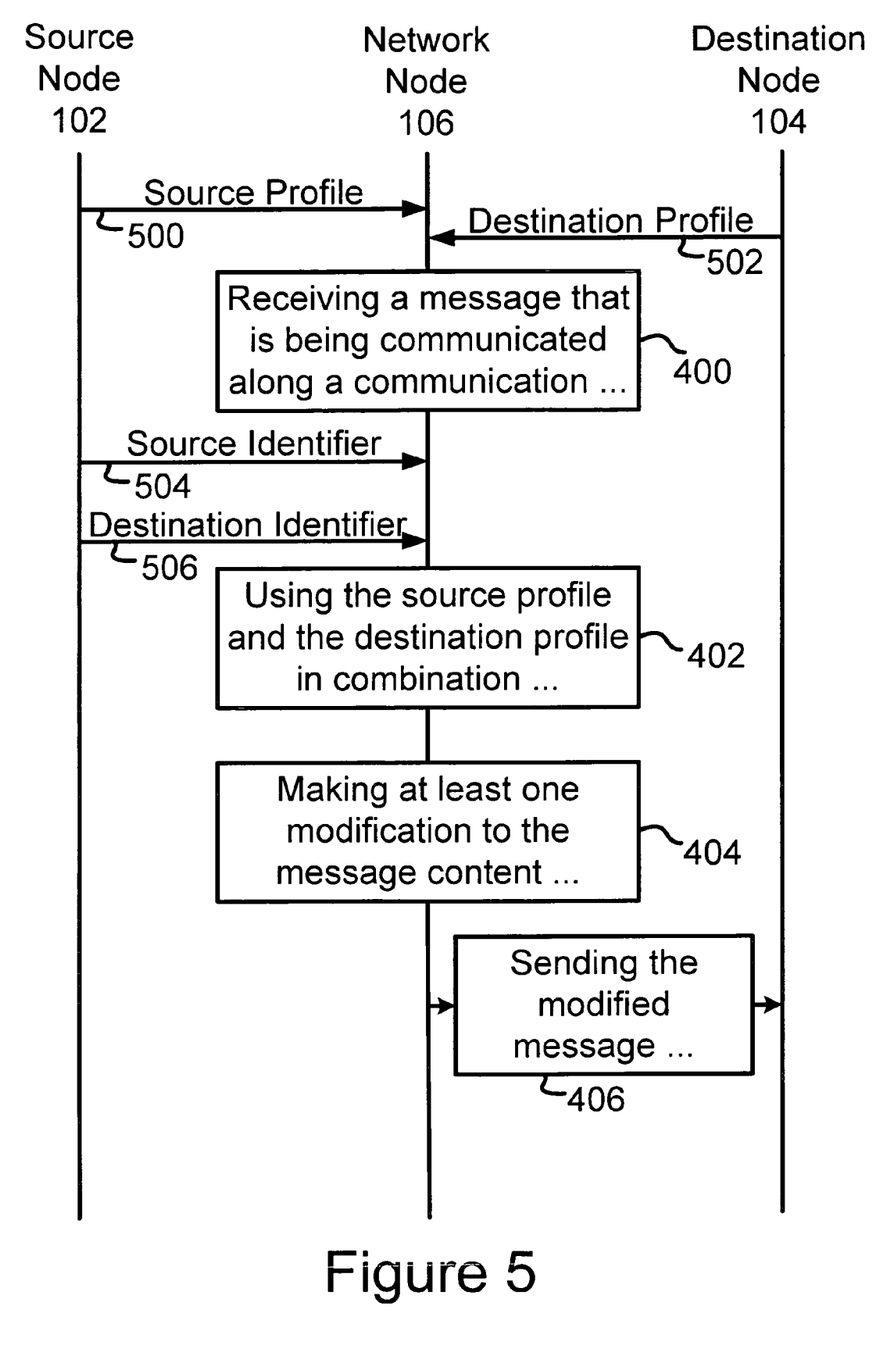
FIG. 5 is a diagram depicting functions that can be carried out in combination with the functions shown in FIG. 4, in accordance with the exemplary embodiment.

FIG. 5 is a diagram that depicts additional functions that can be carried out in combination with the functions shown in FIG. 4. Although these additional functions will be described in a particular order, one or more of these additional functions may occur in an order other than described herein or may not occur at all.

Various methods may be used to provide the network node 106 with a source profile. For example, at line 500, the network node 106 receives a source profile that is transmitted from the source node 102. The source node 102 may transmit the source profile in response to receiving a request message that requests the source node 102 to transmit the source profile to the network node 106. This request message could be transmitted from the network node 106.

The network node 106 may receive the source profile at the same time the network node receives the message at block 400. The source profile could be included with the message received at block 400. Alternatively, the network node 106 may receive the source profile prior to the network node 106 receiving the message at block 400 or after the network node 106 receives the message at block 400. Other examples of methods used to provide the network node 106 with a source profile are also possible.

After receiving the source profile, the network node 106 can store the source profile in data storage, such as data storage 206. Storage of the source profile in data storage may take place prior to the network node 106 receiving the message at block 400.

Various methods may be used to provide the network node 106 with a destination profile. For example, at line 502, the network node 106 receives a destination profile that is transmitted from the destination node 104. The destination node 104 may transmit the destination profile in response to receiving a request message that requests the destination node 104 to transmit the destination profile to the network node 106. This request message could be transmitted from the network node 106.

The network node 106 may receive the destination profile at the same time the network node receives the message at block 400. The destination profile could be included with the message received at block 400. Alternatively, the network node 106 may receive the destination profile prior to the network node 106 receiving the message at block 400 or after the network node 106 receives the message at block 400. Other examples of methods used to provide the network node 106 with a destination profile are also possible.

After receiving the destination profile, the network node 106 can store the destination profile in data storage, such as data storage 206. Storage of the destination profile in data storage may take place prior to the network node 106 receiving the message at block 400.

The network node 106 may use a source node identifier to identify the source profile associated with the source node 102, from among a plurality of source profiles. Various methods may be used to provide the network node 106 with a source node identifier. For example, at line 504, the network node 106 receives a source node identifier that is transmitted from the source node 102. The source node 102 may transmit the source node identifier in response to receiving a request message that requests the source node 102 to transmit the source node identifier to the network node 106. This request message could be transmitted from the network node 106.

The network node 106 may receive the source node identifier at the same time the network node receives the message at block 400. The source node identifier could be included with the message received at block 400. Alternatively, the network node 106 may receive the source node identifier prior to the network node 106 receiving the message at block 400 or after the network node 106 receives the message at block 400. Other examples of methods used to provide the network node 106 with a source node identifier are also possible.

After receiving the source node identifier, the network node 106 can store the source node identifier in data storage, such as data storage 206. Storage of the source node identifier in data storage may take place prior to the network node 106 receiving the message at block 400.

The network node 106 may use a destination node identifier to identify the destination profile associated with the destination node 104, from among a plurality of destination profiles. Various methods may be used to provide the network node 106 with a destination node identifier. For example, at line 506, the network node 106 receives a destination node identifier that is transmitted from the source node 102. The source node 102 may transmit the destination node identifier in response to receiving a request message that requests the source node 102 to transmit the destination node identifier to the network node 106. This request message could be transmitted from the network node 106.

The network node 106 may receive the destination node identifier at the same time the network node receives the message at block 400. The destination node identifier could be included with the message received at block 400. Alternatively, the network node 106 may receive the destination node identifier prior to the network node 106 receiving the message at block 400 or after the network node 106 receives the message at block 400. Other examples of methods used to provide the network node 106 with a destination node identifier are also possible.

After receiving the destination node identifier, the network node 106 can store the destination node identifier in data storage, such as data storage 206. Storage of the destination node identifier in data storage may take place prior to the network node 106 receiving the message at block 400.

3. CONCLUSION

An exemplary embodiment of the present invention has been described above. Those skilled in the art will understand, however, that changes and modifications may be made to the embodiment described without departing from the true scope and spirit of the present invention, which is defined by the claims.

We claim:

1. At a network node that sits in a communication path between a source node and a destination node, wherein the network node is remote from the source node and the destination node, a method comprising:
   storing, in data storage at the network node, a source profile associated with the source node and a destination profile associated with the destination node;
   receiving, at the network node, a message that is being communicated along the communication path from the source node to the destination node, wherein the message defines message content;
   at the network node, using the stored source profile and the stored destination profile in combination to determine at least one modification to make to the message content;
   at the network node, making the at least one modification to the message content so as to establish a modified message, wherein making the at least one modification to the message content comprises: (i) making a first modification to the message content based on the source profile so as to establish an interim message content, and (ii) making a second modification to the interim message content based on the destination profile; and
   sending the modified message from the network node to the communication path for transmission, in turn, to the destination node.

2. At a network node that sits in a communication path between a source node and a destination node, wherein the network node is remote from the source node and the destination node, a method comprising:
   storing, in data storage at the network node, a source profile associated with the source node and a destination profile associated with the destination node;
   receiving, at the network node, a message that is being communicated along the communication path from the source node to the destination node, wherein the message defines message content;
   at the network node, using the stored source profile and the stored destination profile in combination to determine at least one modification to make to the message content;
   at the network node, making the at least one modification to the message content so as to establish a modified message, wherein making the at least one modification to the message content comprises: (i) making a first modification to the message content based on the destination profile so as to establish an interim message content, and (ii) making a second modification to the interim message content based on the source profile; and
   sending the modified message from the network node to the communication path for transmission, in turn, to the destination node.

3. The method of claim 2, wherein making the first modification to the message content comprises translating the message content from a first language to a second language; and
   wherein making the second modification to the interim message content comprises converting the message content in the second language from a visual format to an audible format.

4. At a network node that sits in a communication path between a source node and a destination node, wherein the network node is remote from the source node and the destination node, a method comprising:
   prior to receiving a message that is being communicated along the communication path from the source node to the destination node, wherein the message defines message content, receiving a source profile at the network node, the source profile being associated with the source node; receiving, at the network node, the message that is being communicated along the communication path from the source node to the destination node;
   after receiving the message and prior to using the source profile and a destination profile in combination to determine at least one modification to make to the message content, transmitting a request for the destination profile and receiving the destination profile in response;
   storing, in data storage at the network node, the source profile associated with the source node and the destination profile associated with the destination node;
   at the network node, using the stored source profile and the stored destination profile in combination to determine the at least one modification to make to the message content;
   at the network node, making the at least one modification to the message content so as to establish a modified message; and
   sending the modified message from the network node to the communication path for transmission, in turn, to the destination node.

5. The method of claim 4,
   wherein prior to making the at least one modification to the message content, the message content is in a first language,
   wherein the source profile specifies particular background music, and the destination profile specifies a second language, and
   wherein after making the at least one modification, the message content is in the second language and comprises the particular background music.

6. The method of claim 4,
   wherein prior to making the at least one modification to the message content, the message content is in a first language,
   wherein the source profile specifies one or more graphics, and the destination profile specifies a second language, and
   wherein after making the at least one modification, the message content is in the second language and comprises the one or more graphics.

7. The method of claim 6, wherein the one or more graphics is selected from the group consisting of: (i) a background color, (ii) a background image, (iii) a font, (iv) a font size, and (v) a font color.

8. The method of claim 4,
wherein prior to making the at least one modification to the message content, the message content comprises encoded speech in a first language,
wherein the source profile specifies one or more voice characteristics, and the destination profile specifies a second language, and
wherein after making the at least one modification, the modified message content comprises encoded speech in the second language and with the one or more voice characteristics.

9. The method of claim 8, wherein the one or more voice characteristics is selected from the group consisting of: (i) a man's voice, (ii) a woman's voice, (iii) a girl's voice, (iv) a boy's voice, and (v) a singing voice.

10. The method of claim 4, further comprising:
receiving, at the network node from the source node, a source node identifier associated with the message and a destination node identifier associated with the message;
using the source node identifier to identify the source profile from among a plurality of source profiles; and
using the destination node identifier to identify the destination profile from among a plurality of destination profiles.

11. A network node that sits in a communication path between a source node and a destination node, wherein the network node is remote from the source node and the destination node, the network node comprising:
a communication interface for receiving a message being transmitted along the communication path from the source node to the destination node, and for transmitting a modified version of the message along the communication path for receipt by the destination node, the message defining message content and comprising a source profile associated with the source node and a destination profile associated with the destination node;
a processor; and
a data storage device for storing (i) the source profile associated with the source node, (ii) the destination profile associated with the destination node, and (iii) program instructions executable by the processor,
wherein the program instructions comprise instructions for (i) using the source profile and the destination profile in combination to determine at least one modification to make to message content of the received message, and (ii) making the at least one modification to the message content so as to produce the modified version of the message.

12. The network node of claim 11, wherein making the at least one modification to the message content comprises translating the message content from a first language to a second language.

13. The network node of claim 11, wherein making the at least one modification to the message content comprises converting encoded speech to encoded text.

14. The network node of claim 11, wherein making the at least one modification to the message content comprises converting encoded text to encoded speech.

15. The network node of claim 11, wherein making the at least one modification to the message content comprises adding background music to the message content.

16. The network node of claim 11, further comprising:
means for readdressing the modified version of the message to an address of an intermediate node for routing the modified version of the message along the communication path towards the destination node.

17. The network node of claim 11, wherein the communication interface comprises means for receiving the source profile and the destination profile.

* * * * *